(12) United States Patent
Funada (10) Patent No.: US 9,471,960 B2
(45) Date of Patent: Oct. 18, 2016

(54) DISPLAY APPARATUS AND METHOD OF CONTROLLING THE SAME

(71) Applicant: CANON KABUSHIKI KAISHA, Tokyo (JP)

(72) Inventor: Masahiro Funada, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/589,078

(22) Filed: Jan. 5, 2015

(65) Prior Publication Data
US 2015/0193913 A1 Jul. 9, 2015

(30) Foreign Application Priority Data
Jan. 6, 2014 (JP) .................. 2014-000153

(51) Int. Cl.
*G06T 3/60* (2006.01)
*G09G 5/22* (2006.01)
*G09G 5/38* (2006.01)
*G06T 11/60* (2006.01)
*G09G 5/377* (2006.01)
*G09G 5/00* (2006.01)

(52) U.S. Cl.
CPC .............. *G06T 3/60* (2013.01); *G06T 11/60* (2013.01); *G09G 5/005* (2013.01); *G06T 2200/16* (2013.01); *G09G 2340/0442* (2013.01); *G09G 2340/0492* (2013.01); *G09G 2340/12* (2013.01); *G09G 2370/04* (2013.01)

(58) Field of Classification Search
None
See application file for complete search history.

(56) References Cited

U.S. PATENT DOCUMENTS

| | | | | | |
|---|---|---|---|---|---|
| 4,929,085 A | * | 5/1990 | Kajihara | ................ | G06T 3/606 345/658 |
| 4,952,920 A | * | 8/1990 | Hayashi | ................ | G09G 5/393 345/658 |
| 5,329,289 A | * | 7/1994 | Sakamoto | ................ | G06F 1/16 248/922 |
| 5,774,233 A | * | 6/1998 | Sakamoto | ................ | G06F 1/16 345/649 |
| 5,973,664 A | * | 10/1999 | Badger | ................ | G09G 5/393 345/537 |
| 6,765,577 B1 | * | 7/2004 | Tang | ................ | G06F 17/214 345/471 |

(Continued)

FOREIGN PATENT DOCUMENTS

EP        1071282 A2    1/2001
JP        2001034253 A  2/2001

*Primary Examiner* — Kimberly A Williams
(74) *Attorney, Agent, or Firm* — Rossi, Kimms & McDowell LLP (57) ABSTRACT

A display apparatus includes an image input unit capable of inputting an image in a first format in which a first resolution in a first direction is higher than a second resolution in a second direction and an image in a second format in which the second resolution is higher than the first resolution, a determination unit configured to determine whether a format of the image input via the image input unit is the first format or the second format, a rotation unit configured to rotate the image such that the first and second directions are replaced with each other, a rotation controller configured to control the rotation unit depending on the format of the image, and a display unit configured to display an output image from the rotation unit.

11 Claims, 5 Drawing Sheets

(56) References Cited

U.S. PATENT DOCUMENTS

| | | | | |
|---|---|---|---|---|
| 6,819,334 B1* | 11/2004 | Owada | G09G 5/393 | |
| | | | 345/649 | |
| 7,697,016 B2* | 4/2010 | Sakakura | G06T 3/60 | |
| | | | 345/441 | |
| 7,800,634 B2* | 9/2010 | Baek | G06T 3/606 | |
| | | | 345/649 | |
| 8,339,422 B2* | 12/2012 | Yamada | G06F 3/14 | |
| | | | 345/649 | |
| 2002/0021305 A1* | 2/2002 | Cheng | G06T 3/606 | |
| | | | 345/658 | |
| 2003/0095124 A1* | 5/2003 | Tjandrasuwita | G09G 5/395 | |
| | | | 345/538 | |
| 2005/0020317 A1* | 1/2005 | Koyama | G09G 3/00 | |
| | | | 455/566 | |
| 2005/0041147 A1* | 2/2005 | Kim | H04N 5/44504 | |
| | | | 348/511 | |
| 2005/0212931 A1* | 9/2005 | Gallagher | H04N 5/23248 | |
| | | | 348/239 | |
| 2011/0310095 A1* | 12/2011 | Tung | G06T 15/503 | |
| | | | 345/419 | |
| 2012/0127167 A1* | 5/2012 | Suzuki | H04N 13/007 | |
| | | | 345/419 | |
| 2012/0300027 A1* | 11/2012 | Urisu | H04N 13/007 | |
| | | | 348/43 | |
| 2013/0181968 A1* | 7/2013 | Uemura | G02B 27/2214 | |
| | | | 345/212 | |
| 2014/0015940 A1* | 1/2014 | Yoshida | H04N 13/0029 | |
| | | | 348/54 | |

\* cited by examiner

DISPLAY APPARATUS AND METHOD OF CONTROLLING THE SAME

BACKGROUND OF THE INVENTION

1. Field of the Invention

The present invention relates to a display apparatus capable of inputting image signals in a plurality of formats.

2. Description of the Related Art

A display apparatus such as a liquid crystal display projector is typically used in a horizontally-long state, and may be used in a vertically-long state in some cases. When the display apparatus is used in the vertically-long state, it is necessary to change a vertical direction by using an image output device such as a computer.

For example, when the display apparatus having a resolution of 1024×768 is set up to be rotated by 90 degrees in a clockwise direction, an original image with a resolution of 768×1024 is created and is rotated by 90 degrees in a counterclockwise direction such that an image is output as a transmitted signal with a resolution of 1024×768. In this configuration, the vertically-long original image created by the image output device is changed to the transmitted signal in a horizontally-long image signal format, and then it is rotated to be in an original vertical direction by the display apparatus and is displayed as a vertically-long image.

When the setup direction of the display apparatus is changed as described above, it is necessary to change a vertical direction of a menu that is displayed as an OSD (on-screen display). Japanese Patent Laid-open No. 2001-34253 discloses an on-screen display control apparatus that includes a sensor detecting whether a screen is in a horizontally-long state or a vertically-long state and that rotates an OSD menu according to a detection result of the sensor to perform display in a correct vertical direction.

However, the on-screen display control apparatus disclosed in Japanese Patent Laid-open No. 2001-34253 is applicable only when the transmitted image signal format is horizontally long.

SUMMARY OF THE INVENTION

The present invention provides a display apparatus and a method of controlling the display apparatus that are capable of correctly displaying a direction of an input image in both cases where a long axis direction of the input image is a vertical direction and a horizontal direction.

A display apparatus as one aspect of the present invention includes an image input unit capable of inputting an image in a first format in which a first resolution in a first direction is higher than a second resolution in a second direction and an image in a second format in which the second resolution is higher than the first resolution, a determination unit configured to determine whether a format of the image input via the image input unit is the first format or the second format, a rotation unit configured to rotate the image such that the first and second directions are replaced with each other, a rotation controller configured to control the rotation unit depending on the format of the image, and a display unit configured to display an output image from the rotation unit.

A method of controlling a display apparatus as another aspect of the present invention includes the steps of inputting an image in a first format in which a first resolution in a first direction is higher than a second resolution in a second direction or an image in a second format in which the second resolution is higher than the first resolution, determining whether a format of the image is the first format or the second format, rotating the image such that the first and second directions are replaced with each other when the format of the image is the first format, and displaying an output image.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

[Embodiment 1]

Figure 1:
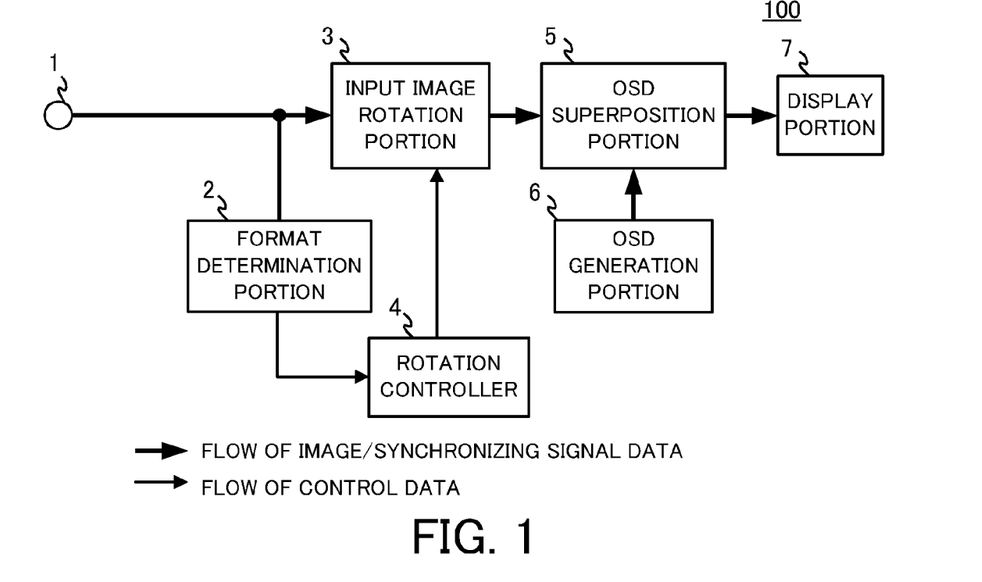
FIG. 1 is a block diagram of a display apparatus in Embodiment 1.

First of all, referring to FIG. 1, the configuration of a display apparatus in Embodiment 1 of the present invention will be described. FIG. 1 is a block diagram of a display apparatus 100 in this embodiment.

The display apparatus 100 includes an input terminal 1, a format determination portion 2, an input image rotation portion 3, a rotation controller 4, an OSD superposition portion 5, an OSD generation portion 6, and a display portion 7. The display apparatus 100 of this embodiment can be applied to a projection display apparatus such as a liquid crystal projector or a DLP (Digital Light Processing) projector, or a liquid crystal display. The display apparatus 100 (display portion 7) of this embodiment performs vertically-long display in which a horizontal resolution is 768 pixels and a vertical resolution is 1024 pixels.

The input terminal 1 is a unit (image input unit) that inputs an image (image signal) from an external apparatus, and is capable of connecting an image output device (external apparatus) such as a computer. An original image that is sequentially generated by the image output device and that is converted into a transmissive signal format is input to the input terminal 1. In this embodiment, the transmissive signal format includes a first signal format that transmits an image with a horizontally-long resolution in which a vertically-long original image is rotated by 90 degrees and a second signal format that transmits an image with a vertically-long resolution which is constituted by the vertically-long original image as it is (i.e. without rotating the original image). Thus, the input terminal 1 is configured to be capable of inputting images in the first signal format (first format) and the second signal format (second format).

The image in the first signal format is an image in which a resolution (first resolution) in a horizontal direction (first direction) is higher than a resolution (second resolution) in a vertical direction (second direction), for example, a horizontal resolution is 1024 pixels and a vertical resolution is 768 pixels. The image in the second signal format is an image in which the resolution (second resolution) in the vertical direction (second direction) is higher than the resolution (first resolution) in the horizontal direction (first direction), for example, the horizontal resolution is 768 pixels and the vertical resolution is 1024 pixels. In other words, the image in the first signal format is an image in which an aspect ratio is horizontally long, and the image in the second signal format is an image in which the aspect ratio is vertically long. In this embodiment, the first signal format is a format in which vertical directions of an original image and a transmitted image are orthogonal to each other, and the second format is a format in which the vertical directions of the original image and the transmitted image coincide with (i.e. are equal to) each other.

The format determination portion 2 (long axis determination unit) is a determination unit that analyzes the image signal input from the external apparatus via the input terminal 1 and that determines a format such as a resolution of the image signal. In other words, the format determination portion 2 determines whether the format of the image (image signal) input via the input terminal 1 is the first signal format or the second signal format. For example, when the input image signal is an analog RGB signal, the format determination portion 2 measures frequencies (or cycles) of a horizontal synchronizing signal and a vertical synchronizing signal. Then, the format determination portion 2 is capable of searching a table (not illustrated) that is associated with information on resolutions or the like for all applicable signal formats based on the measured frequency (or cycle) to determine the format such as resolution of the image signal. The format determination portion 2, for example, compares the resolutions in the horizontal and vertical directions in response to a request for obtaining information of a long axis direction from a rotation controller 4 described below, and sends the direction in which the resolution is higher (long axis direction) back to the rotation controller 4.

The input image rotation portion 3 (rotation unit) includes a frame buffer (memory) which is not illustrated, and replaces horizontal pixel data and vertical pixel data in the input image with each other to rotate the input image (pixel data) by 90 degrees in a clockwise direction or a counterclockwise direction. In other words, the input image rotation portion 3 rotates the image such that the horizontal direction (first direction) and the vertical direction (second direction) are replaced (exchanged) with each other. For ease of explanation, it is assumed that the frame buffer of the input image rotation portion 3 is addressed in a matrix.

When the input image is to be rotated in the clockwise direction, the writing of the input image (pixel data) is performed so that the writing on one horizontal line from the left end pixel toward the right end pixel is performed from the upper end toward the lower end for each frame. The reading of the input image (pixel data) is performed so that the reading on one vertical line from the lower end toward the upper end is performed from the left end toward the right end. On the other hand, when the input image is to be rotated in the counterclockwise direction, the reading of the input image is performed so that the reading on one vertical line from the upper end toward the lower end is performed from the right end toward the left end. In this embodiment, when a moving image is to be displayed, it is preferred that the frame buffer have an area for two screens and be controlled such that a screen during write is not be read. The input image rotation portion 3 is configured to select one of "non-rotation", "rotation by 90 degrees in the clockwise direction", or "rotation by 90 degrees in the counterclockwise direction" for the input image in accordance with the setting of the rotation controller 4 described below (by the control of the rotation controller 4).

The rotation controller 4 (rotation control unit) obtains the long axis direction of the input image based on the information (determination signal) from the format determination portion 2. Then, the rotation controller 4 sets, to the input image rotation portion 3, the presence or absence of the rotation and the rotation direction for the image ("non-rotation", "rotation by 90 degrees in the clockwise direction", or "rotation by 90 degrees in the counterclockwise direction"). The rotation direction is previously determined by a menu (not illustrated) or the like. Thus, the rotation controller 4 controls the input image rotation portion 3 depending on the format (first signal format or second signal format) of the image.

Figure 2:
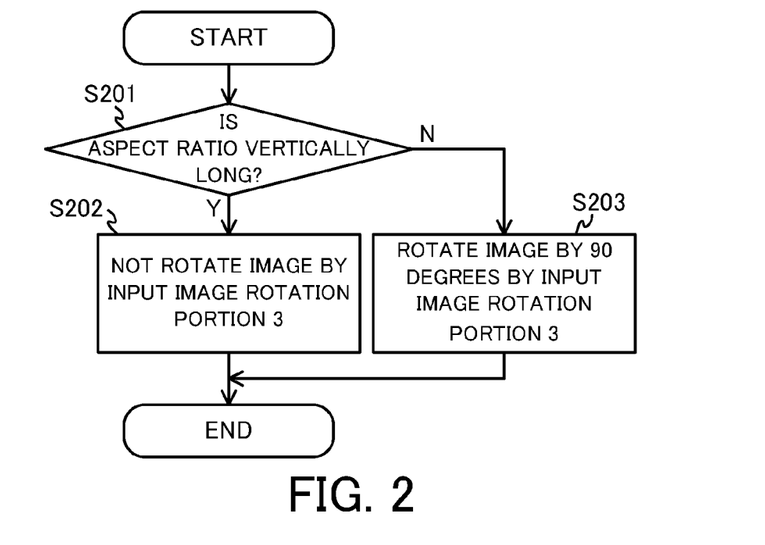
FIG. 2 is a flowchart of illustrating rotation control by a rotation controller in Embodiment 1.

Referring to FIG. 2, the control of the rotation controller 4 for the input image rotation portion 3 (image rotation control) will be described. FIG. 2 is a flowchart of illustrating the rotation control by the rotation controller 4 in this embodiment. First of all, at Step S201, the rotation controller 4 determines whether the aspect ratio of the input image is vertically long based on the long axis direction that is obtained by the information (determination result) from the format determination portion 2. When the aspect ratio is vertically long (when the long axis direction of the image is the vertical direction), at Step S202, the rotation controller 4 controls the input image rotation portion 3 so as not to rotate the input image. On the other hand, when the aspect ratio is horizontally long (when the long axis direction of the image is the horizontal direction), at Step S203, the rotation controller 4 controls the input image rotation portion 3 so as to rotate the input image by 90 degrees.

In the display apparatus 100 of FIG. 1, the OSD superposition portion 5 (on-screen superposition unit) superposes an OSD image outputted from the OSD generation portion 6 on the image (image signal) output from the input image rotation portion 3 to generate a digital image signal. The OSD generation portion 6 generates the image (OSD image) such as a menu in accordance with the operation of a button (not illustrated) by a user, and outputs the generated image to the OSD superposition portion 5.

The display portion 7 (display unit) displays the output image from the input image rotation portion 3. In this embodiment, the display unit 7 displays the output image from the input image rotation portion 3 via the OSD superposition portion 5, and may be also configured to directly display the output image from the input image rotation portion 3 without the OSD superposition portion 5. The display portion 7 displays the digital image signal input from the OSD superposition portion 5 as an optical image by using a dot matrix with a predetermined resolution. In this embodiment, it is preferred that the resolution of the display portion 7 be the same as the resolution (horizontally 768 pixels and vertically 1024 pixels) of the display apparatus 100. In other words, the display portion 7 has a second resolution in a horizontal direction (first direction) and a first resolution in a vertical direction (second direction). The display portion 7 of this embodiment updates the display of one horizontal line from the left end pixel toward the right end pixel, from the upper end toward the lower end.

Figure 3:
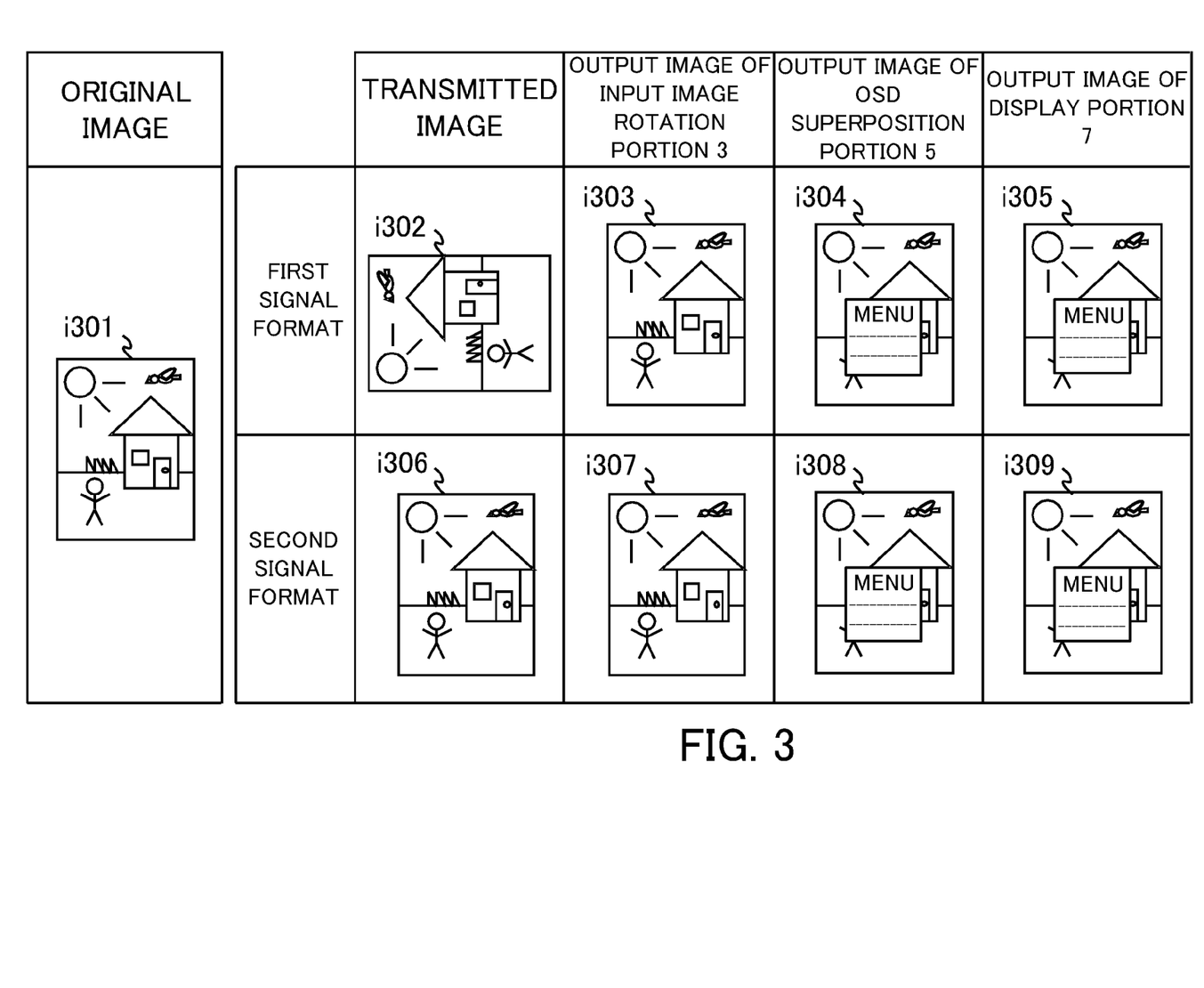
FIG. 3 is a diagram of describing image processing by the display apparatus in Embodiment 1.

Subsequently, referring to FIG. 3, the image processing by the display apparatus 100 of this embodiment will be described. FIG. 3 is a diagram of describing the image processing by the display apparatus 100. FIG. 3 is images, with respect to each of the first signal format and the second signal format, of illustrating the processing by each portion in which an original image that is sequentially generated by the image output device (external apparatus) is displayed on the display portion 7 of the display apparatus 100.

Reference numeral i301 in FIG. 3 denotes an original image (with a resolution of horizontally 768 pixels and vertically 1024 pixels) that is generated by the image output device such as a computer (external apparatus). First, a case where the image is to be transmitted in the first signal format will be described. When the display apparatus 100 is set to input the image from the image output device in the first signal format, the image output device rotates the image by 90 degrees in the counterclockwise direction to be transmitted in a horizontally-long format (image i302) that has a resolution with horizontally 1024 pixels and vertically 768 pixels. In this case, the format determination portion 2 of the display apparatus 100 determines that the long axis direction is the horizontal direction. Then, the rotation controller 4 instructs the input image rotation portion 3 to rotate the image input via the input terminal 1 by 90 degrees in the clockwise direction. As a result, an image i303 is obtained as an output image of the input image rotation portion 3. In this embodiment, when a menu display is performed, the OSD superposition portion 5 superposes the menu image generated by the OSD generation portion 6 on the output image (image i303) of the input image rotation portion 3. As a result, an image i304 is obtained as an output image of the OSD superposition portion 5. The display portion 7 displays the output image of the OSD superposition portion 5 as it is (image i305).

Subsequently, a case where the image is to be transmitted in the second signal format will be described. When the display apparatus 100 is set to input the image from the image output device (external apparatus) in the second signal format, the image output device transmits the image without rotation in a vertically-long format (image i306) that has a resolution with horizontally 768 pixels and vertically 1024 pixels. In this case, the format determination portion 2 of the display apparatus 100 determines that the long axis direction of the input image is the vertical direction. Then, the rotation controller 4 instructs the input image rotation portion 3 so as not to rotate the image. As a result, an image i307 is obtained as an output image of the input image rotation portion 3. In this embodiment, when a menu display is performed, the OSD superposition portion 5 superposes the menu image generated by the OSD generation portion 6 on the output image (image i307) of the input image rotation portion 3. As a result, an image i308 is obtained as an output image of the OSD superposition portion 5. The display portion 7 displays the output image of the OSD superposition portion 5 as it is (image i309). In this embodiment, when the display apparatus 100 has a function of performing a resolution conversion with respect to the resolutions of the first signal format and the second signal format, a transmission with an arbitrary resolution can be performed.

It is preferred that the rotation controller 4 control the input image rotation portion 3 so as to rotate the image by 90 degrees when the image is in the first signal format. On the other hand, it is preferred that the rotation controller 4 control the input image rotation portion 3 so as not to rotate the image when the image is in the second signal format.

It is preferred that the format determination portion 2 compare the first resolution in the horizontal direction (first direction) with the second resolution in the vertical direction (second direction) with respect to the image input via the input terminal 1, and determine that a direction in which a resolution is the higher of the two is the long axis direction. Then, the rotation controller 4 controls the input image rotation portion 3 such that the long axis directions of the image and the display portion 7 coincide with each other.

More preferably, the input image rotation portion 3 includes a memory (frame buffer) that temporarily stores the pixel data of the image input via the input terminal 1. The input image rotation portion 3 performs access control such that the writing direction and the reading direction of the pixel data are orthogonal to each other to rotate the image by 90 degrees.

More preferably, the display apparatus 100 includes the OSD superposition portion 5 that superposes an on-screen display (OSD image) on the output image from the input image rotation portion 3. The display portion 7 displays the image obtained by superposing the on-screen display (OSD image) on the output image from the input image rotation portion 3.

According to this embodiment, the directions of the input image and the OSD image (OSD menu), i.e. vertical directions, can be correctly displayed in both cases where the format of the input image signal is horizontally long and vertically long. In this embodiment, the resolution of the display portion 7 is horizontally 768 pixels and vertically 1024 pixels, but the embodiment is not limited to this.

[Embodiment 2]

Figure 4:
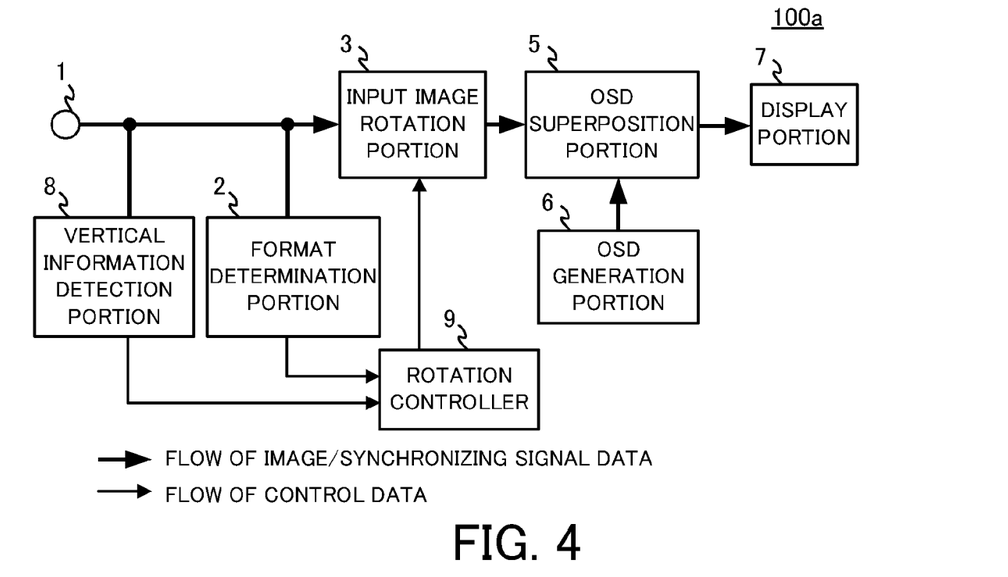
FIG. 4 is a block diagram of a display apparatus in Embodiment 2.

Next, referring to FIG. 4, the configuration of a display apparatus in Embodiment 2 of the present invention will be described. FIG. 4 is a block diagram of a display apparatus 100a in this embodiment. The display apparatus 100a is different from the display apparatus 100 of Embodiment 1 in that a vertical information detection portion 8 is added and the rotation controller 4 is replaced with a rotation controller 9. Since other configurations of the display apparatus 100a are the same as those of the display apparatus 100 of Embodiment 1, descriptions thereof are omitted.

When information (rotation information) indicating a vertical direction of an original image is added to an image that is input from an external apparatus via the input terminal 1, the vertical information detection portion 8 (vertical information detector) detects the information. In this embodiment, there are three states of "non-rotation", "rotation by 90 degrees", and "rotation by 270 degrees" as states relating to a rotation direction of the input image (states that are determined based on the rotation information). As a method of adding the vertical direction to the original image, for example, there is a method of using InfoFrame, CEC, or DDC in transmitting an image signal in the transmission of the image signal such as HDMI. When the rotation controller 9 of this embodiment obtains the information detected by the vertical information detection portion 8 (vertical direction), it is configured to make the information (vertical information) a priority and control (set) the presence or absence of rotation and a rotation direction for the input image rotation portion 3.

Figure 5:
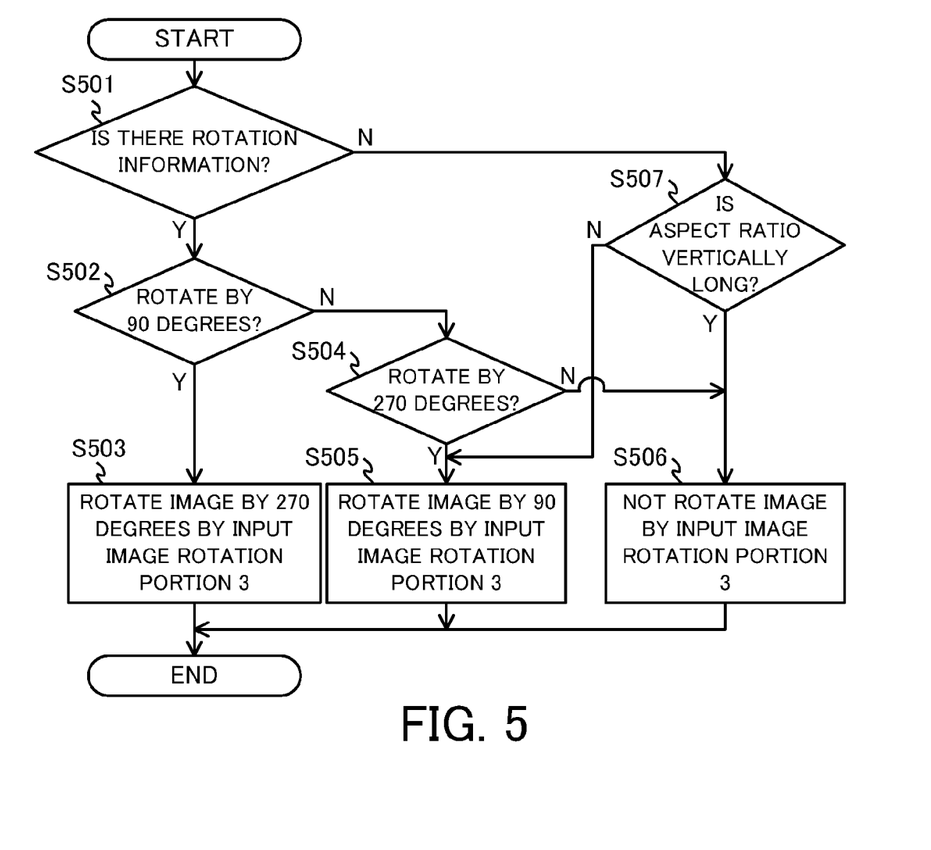
FIG. 5 is a flowchart of illustrating rotation control by a rotation controller in Embodiment 2.

Referring to FIG. 5, control (image rotation control) by the rotation controller 9 for the input image rotation portion 3 will be described. FIG. 5 is a flowchart of illustrating the rotation control by the rotation controller 9 in this embodiment. First of all, at Step S501, the vertical information detection portion 8 determines whether the information (rotation information) indicating the vertical direction of the original image is added to the image input from the external apparatus via the input terminal 1, i.e. whether the rotation information is contained. When the rotation information is added to the input image and the vertical information detection portion 8 detects the rotation information, the flow proceeds to Step S502. On the other hand, the rotation information is not added to the image and the vertical information detection portion 8 does not detect the rotation information, the flow proceeds to Step S507.

At Step S502, the vertical information detection portion 8 determines whether the detected rotation information is "90 degrees" (rotation by 90 degrees). When the detected rotation information is "90 degrees", the flow proceeds to Step S503. On the other hand, when the detected rotation information is not "90 degrees", the flow proceeds to Step S504. At Step S503, in order to restore the vertical direction of the input image, the rotation controller 9 controls the input image rotation portion 3 so as to rotate the image by 270 degrees. According to the control by the rotation controller 9, the input image rotation portion 3 is set to rotate the vertical direction of the input image by 270 degrees.

At Step S504, the vertical information detection portion 8 determines whether the detected rotation information is "270 degrees" (rotation by 270 degrees). When the detected rotation information is "270 degrees", the flow proceeds to Step S505. At Step S505, in order to restore the vertical direction of the input image, the rotation controller 9 controls the input image rotation portion 3 so as to rotate the image by 90 degrees. According to the control by the rotation controller 9, the input image rotation portion 3 is set to rotate the vertical direction of the input image by 90 degrees. On the other hand, at Step S504, when the detected rotation information is not "270 degrees", the vertical information detection portion 8 determines that the rotation information of the input image is "non-rotation" and the flow proceeds to Step S506.

At Step S507, the rotation controller 9 determines whether an aspect ratio of the input image is vertically long based on a long axis direction that is obtained by information (determination result) from the format determination portion 2. When the aspect ratio is vertically long (when a long axis is the vertical direction), at Step S506, the rotation controller 9 controls the input image rotation portion 3 so as not to rotate the input image. On the other hand, when the aspect ratio is horizontally long (when the long axis is the horizontal direction), at Step S505, the rotation controller 9 controls the input image rotation portion 3 so as to rotate the input image by 90 degrees.

Thus, in this embodiment, the display apparatus 100a includes the vertical information detection portion 8 that detects the information on the vertical direction of the original image contained in the image input via the input terminal 1. When the vertical information detection portion 8 detects the information on the vertical direction, the rotation controller 9 controls the input image rotation portion 3 based on the information.

According to the display apparatus of this embodiment, when the information (rotation information) indicating the vertical direction of the original image is provided along with the image, a correct vertical direction can be automatically restored even if a transmitted vertical direction is rotated (changed).

[Embodiment 3]

Figure 6:
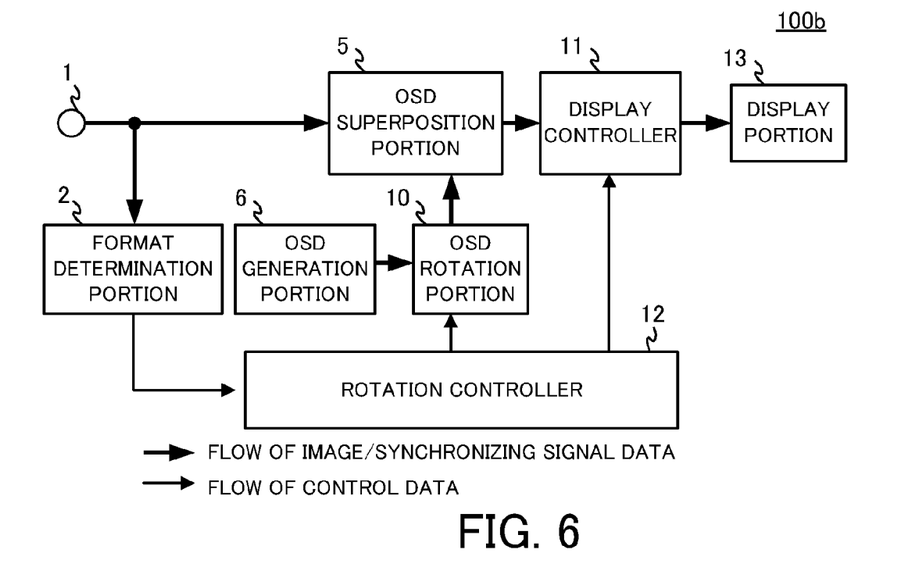
FIG. 6 is a block diagram of a display apparatus in Embodiment 3.

Next, referring to FIG. 6, the configuration of a display apparatus in Embodiment 3 of the present invention will be described. FIG. 6 is a block diagram of a display apparatus 100b in this embodiment. The display apparatus 100b includes the input terminal 1, the format determination portion 2, the OSD superposition portion 5, the OSD generation portion 6, an OSD rotation portion 10, a display controller 11, a rotation controller 12, and a display portion 13. The display apparatus 100b of this embodiment, similarly to Embodiment 1, performs vertically-long display in which a horizontal resolution is 768 pixels and a vertical resolution is 1024 pixels. In this embodiment, since the input terminal 1, the format determination portion 2, the OSD superposition portion 5, and the OSD generation portion 6 are the same as those in Embodiment 1, descriptions thereof are omitted.

The OSD rotation portion 10 (on-screen rotation unit) includes a buffer (not illustrated) and replaces horizontal pixel data and vertical pixel data of an input OSD image (on-screen display) generated by the OSD generation portion 6 with each other. In this embodiment, the OSD rotation portion 10 rotates the on-screen display depending on the format (first signal format or second signal format) of the image. Accordingly, the OSD rotation portion 10 is capable of rotate the OSD image by 90 degrees in the clockwise direction or the counterclockwise direction. In this embodiment, for ease of explanation, it is assumed that the buffer of the OSD rotation portion 10 is addressed in a matrix.

When the input OSD image is to be rotated in the clockwise direction, the writing of the input OSD image is performed so that the writing on one horizontal line from the left end pixel toward the right end pixel is performed from the upper end toward the lower end for each frame. The reading of the OSD image is performed so that the reading on one vertical line from the lower end toward the upper end of the OSD image in the buffer is performed from the left end toward the right end. On the other hand, when the input OSD image is to be rotated in the counterclockwise direction, the reading of the OSD image is performed so that the reading on one vertical line from the upper end toward the lower end is performed from the right end toward the left end. In this embodiment, the OSD rotation portion 10 or the display controller 11 is configured to select one of "non-rotation", "rotation by 90 degrees in the clockwise direction", or "rotation by 90 degrees in the counterclockwise direction" for the OSD image or the digital image signal in accordance with the setting of the rotation controller 12 described below (by the control of the rotation controller 12).

The display controller 11 (rotation unit) controls a scanning direction of the display portion 13 described below, and rotates an image that is displayed on the display portion 13 by 90 degrees in the clockwise direction or the counterclockwise direction. When the image displayed on the display portion 13 is "non-rotation", the display controller 11 controls the scanning direction of the display portion 13 so as to remain in a scanning direction of the input image, i.e. controls the scanning direction of the display portion 13 so as to be equal to the scanning direction of the of the input image. When the image displayed on the display portion 13 is "rotation by 90 degrees in the clockwise direction", the display controller 11 controls the scanning for one frame by the display portion 13 such that the scanning in a vertical direction from the upper end pixel toward the lower end pixel for each row is developed from the right end toward the left end directions. When the image displayed on the display portion 13 is "rotation by 90 degrees in the counterclockwise direction", the display controller 11 controls the scanning for one frame by the display portion 13 such that the scanning in the vertical direction from the lower end pixel toward the upper end pixel for each row is developed from the left end toward the right end directions.

The rotation controller 12 (rotation control unit) obtains information on a long axis direction from the format determination portion 2, and in accordance with its result (the long axis direction of the image), sets the presence or absence of rotation and the rotation direction of the image to the OSD rotation portion 10 and the display controller 11. The rotation direction is previously set by using a menu of the like. The details of this control will be described below.

In the display apparatus 100b of FIG. 6, the display portion 13 (display unit) displays the digital image signal input from the display controller 11 as an optical image by using a dot matrix with a predetermined resolution. The scanning direction of the display portion 13 is controlled by the display controller 11. With respect to pixel data of the sequentially input image signals, the display portion 13 is capable of developing a line scanning in the horizontal direction to the vertical direction and developing a row scanning in the vertical direction to the horizontal direction. In this embodiment, the resolution of the display portion 13 is the same as the resolution (horizontally 768 pixels and vertically 1024 pixels) of the display portion 7 in the display apparatus 100.

Figure 7:
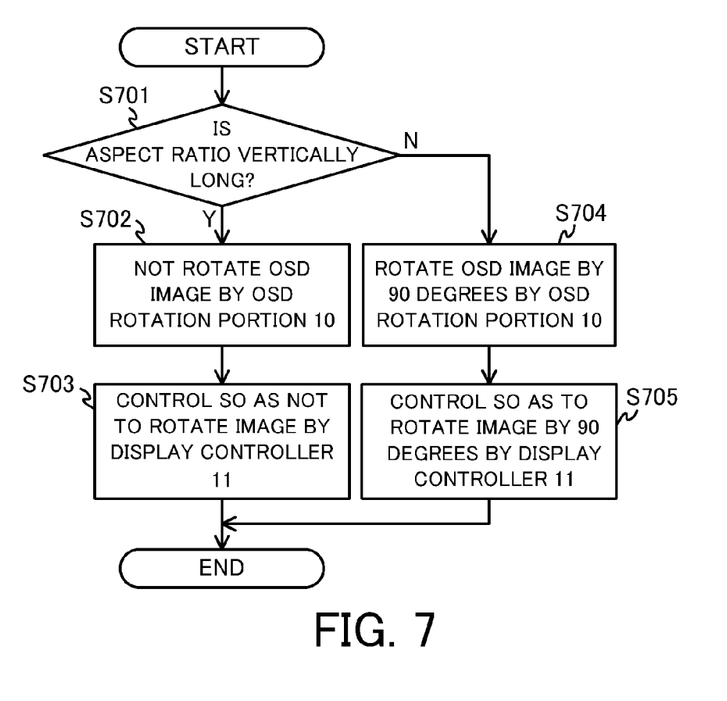
FIG. 7 is a flowchart of illustrating rotation control by a rotation controller in Embodiment 3.

Subsequently, referring to FIG. 7, the control (image rotation control) by the rotation controller 12 for the OSD rotation portion 10 and the display controller 11 will be described. FIG. 7 is a flowchart of illustrating the rotation control by the rotation controller 12 in this embodiment. First of all, at Step S701, the rotation controller 12 determines whether an aspect ratio of the input image is vertically long based on a long axis direction that is obtained by information (determination result) from the format determination portion 2. When the aspect ratio is vertically long (when a long axis is the vertical direction), at Step S702, the rotation controller 12 controls the OSD rotation portion 10 so as not to rotate the input OSD image. On the other hand, when the aspect ratio is horizontally long (when the long axis is the horizontal direction), at Step S704, the rotation controller 12 controls the OSD rotation portion 10 so as to rotate the input OSD image by 90 degrees.

After the rotation controller 12 sets the OSD rotation portion 10 so as not to rotate the OSD image at Step S702, the flow proceeds to Step S703. Then, at Step S703, the rotation controller 12 controls the display controller 11 so as not to rotate (so as to be "non-rotation") the digital image signal output from the OSD superposition portion 5.

On the other hand, when the aspect ratio is horizontally long (when the long axis is the horizontal direction), at Step S704, the rotation controller 12 controls the OSD rotation portion 10 so as to rotate the input OSD image by 90 degrees. As a result, the OSD rotation portion 10 performs rotation by 90 degrees in a direction opposite to the rotation direction set by a menu (not illustrated) or the like. Subsequently, at Step S705, the rotation controller 12 controls the display controller 11 so as to rotate the digital image signal output from the OSD superposition portion 5 by 90 degrees in the rotation direction set by the menu (not illustrated) or the like.

Figure 8:
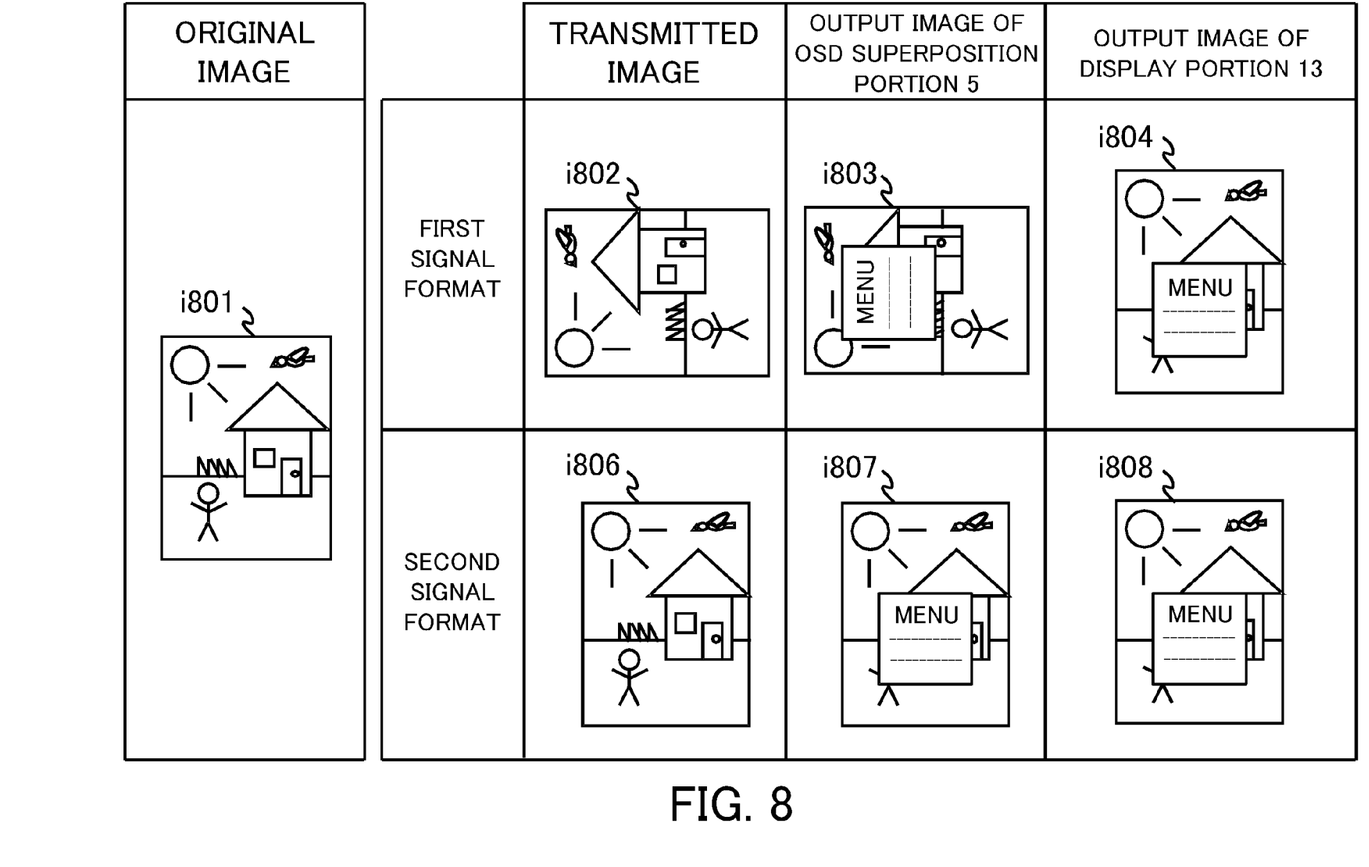
FIG. 8 is a diagram of describing image processing by the display apparatus in Embodiment 3.

Subsequently, referring to FIG. 8, the image processing by the display apparatus 100b of this embodiment will be described. FIG. 8 is a diagram of describing the image processing by the display apparatus 100b. FIG. 8 is images, with respect to each of the first signal format and the second signal format, of illustrating the processing by each portion in which an original image that is sequentially generated by the image output device (external apparatus) is displayed on the display portion 13 of the display apparatus 100b.

Reference numeral i801 in FIG. 8 denotes an original image (with a resolution of horizontally 768 pixels and vertically 1024 pixels) that is generated by the image output device such as a computer (external apparatus). First, a case where the image is to be transmitted in the first signal format will be described. When the display apparatus 100b is set to input the image from the image output device in the first signal format, the image output device rotates the image by 90 degrees in the counterclockwise direction to be transmitted in a horizontally-long format (image i802) that has a resolution with horizontally 1024 pixels and vertically 768 pixels. In this case, the format determination portion 2 of the display apparatus 100b determines that the long axis direction is the horizontal direction. Therefore, when the menu display is to be performed, the OSD rotation portion 10 superposes the menu that is rotated by 90 degrees in the counterclockwise direction by using the OSD superposition portion 5. As a result, an output image (image i803) of the OSD superposition portion 5 is obtained. Then, the display controller 11 controls the scanning direction of the display portion 13 so as to rotate the output image from the OSD superposition portion 5 by 90 degrees in the clockwise direction. As a result, an image i804 is displayed on the display portion 13 as an output image of the display portion 13.

Subsequently, a case where the image is to be transmitted in the second signal format will be described. When the display apparatus 100b is set to input the image from the image output device (external apparatus) in the second signal format, the image output device transmits the image without rotation in a vertically-long format (image i806) that has a resolution with horizontally 768 pixels and vertically 1024 pixels. In this case, the format determination portion 2 of the display apparatus 100b determines that the long axis direction of the input image is the vertical direction. Therefore, when the menu display is to be performed, the OSD rotation portion 10 superposes the menu on the OSD image without rotation by using the OSD superposition portion 5. As a result, an image i807 is obtained as an output image of the OSD superposition portion 5. Then, the display controller 11 controls the scanning direction of the display portion 13 so as not to rotate the digital image signal from the OSD superposition portion 5. As a result, an image i808 is displayed on the display portion 13 as an output image of the display portion 13. In this embodiment, when the display apparatus 100b has a function of performing a resolution conversion with respect to the resolutions of the first signal format and the second signal format, a transmission with an arbitrary resolution can be performed.

As described above, in this embodiment, the OSD superposition portion 5 (on-screen superposition unit) superposes the on-screen display (OSD image) on the image input via the input terminal 1 and outputs an image obtained by superposing the on-screen display to the display controller 11 (rotation unit). When the image is in the first format, the rotation controller 12 controls the OSD rotation portion 10 so as to rotate the on-screen display in a first rotation direction (for example, in the counterclockwise direction). Furthermore, the rotation controller 12 controls the display controller 11 so as to rotate the image obtained by superposing the on-screen display in a second rotation direction (for example, in the clockwise direction) opposite to the first rotation direction.

According to the display apparatus of this embodiment, directions (vertical directions) of the input image and the OSD image (OSD menu) can be correctly displayed in both cases where the input image signal format is horizontally long and vertically long. In this embodiment, the resolution of the display portion 13 is horizontally 768 pixels and vertically 1024 pixels, but the embodiment is not limited to this. Similarly to Embodiment 2, the display apparatus of this embodiment may further include the vertical information detection portion 8 such that the rotation controller 12 determines the rotation direction based on its detection result.

According to each of the embodiments, a display apparatus and a method of controlling the display apparatus that are capable of correctly displaying a direction of an input image in both cases where a long axis direction of the input image is a vertical direction and a horizontal direction can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-000153, filed on January 6, 2014, which is hereby incorporated by reference wherein in its entirety.

What is claimed is:

1. A display apparatus comprising:
an input terminal configured to input an image in a first format where a first resolution in a first direction is higher than a second resolution in a second direction or an image in a second format where the second resolution is higher than the first resolution;
a controller connected to memory and configured to:
determine whether the image input via the input terminal is in the first format or the second format;
temporarily store pixel data of the image input via the input terminal for at least two screens;
perform control so that a screen during writing the pixel data is not read; and
perform access control so that a writing direction and a reading direction of the pixel data are orthogonal to each other to rotate the image by 90 degrees to generate an output image, wherein the access control is performed based on the format of the input image; and
a display configured to display the output image.

2. The display apparatus according to claim 1,
wherein the display has the second resolution in the first direction and has the first resolution in the second direction.

3. The display apparatus according to claim 1,
wherein the controller is configured to:
rotate the image by 90 degrees when the input image is in the first format, and
not rotate the image when the input image is in the second format.

4. The display apparatus according to claim 1,
wherein the controller is configured to compare the first resolution in the first direction with the second resolution in the second direction for the image input via the input terminal and determines that a direction in which a resolution is higher of the first and second resolutions is a long axis direction, and
wherein the long axis direction of the image and a long axis direction of the display coincide with each other.

5. A display apparatus according to claim 1, wherein the controller is configured to superpose an on-screen display on the output image, and
wherein the display unit displays an image that is obtained by superposing the on-screen display on the output image.

6. The display apparatus according to claim 1, wherein the controller is configured to:
rotate an on-screen display depending on the format of the image; and
superpose the on-screen display on the image input via the input terminal and output an image obtained by superposing the on-screen display,
wherein when the image is in the first format, the controller is configured to rotate the on-screen display in a first rotation direction and rotate the image obtained by superposing the on-screen display in a second rotation direction opposite to the first rotation direction.

7. The display apparatus according to claim 1, wherein the controller is configured to detect information on a vertical direction of an original image contained in the image input via the input terminal
and control the rotation based on the information.

8. The display apparatus according to claim 1,
wherein the first format is a format in which vertical directions of an original image and a transmitted image are orthogonal to each other, and
wherein the second format is a format in which the vertical directions of the original image and the transmitted image coincide with each other.

9. The display apparatus according to claim 1,
wherein the controller is configured to determine whether the image input via the input terminal is in the first format or the second format based on horizontal and vertical synchronizing signals.

10. The display apparatus according to claim 9,
wherein the controller is configured to determine the format including information of a resolution of the image by using a table where frequencies of the horizontal and vertical synchronizing signals are associated with the information of the resolution.

11. A method of controlling a display apparatus, the method comprising the steps of:
inputting an image in a first format where a first resolution in a first direction is higher than a second resolution in a second direction or an image in a second format where the second resolution is higher than the first resolution;
determining whether the image is in the first format or the second format;
temporarily storing pixel data of the image input via the inputting step for at least two screens;
rotating the image by 90 degrees by performing access control so that a writing direction and a reading direction of the pixel data are orthogonal to each other while performing control so that a screen during writing the pixel data is not read when the image is in the first format; and
displaying an output image.

* * * * *